US008290865B2

(12) United States Patent
Lawrence et al.

(10) Patent No.: US 8,290,865 B2
(45) Date of Patent: Oct. 16, 2012

(54) PUSH PAYMENT SYSTEM AND METHOD INCLUDING BILLING FILE EXCHANGE

(75) Inventors: Kimberly Lawrence, Foster City, CA (US); Barbara Patterson, South San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 76 days.

(21) Appl. No.: 12/577,609

(22) Filed: Oct. 12, 2009

(65) Prior Publication Data

US 2010/0205078 A1 Aug. 12, 2010

Related U.S. Application Data

(60) Provisional application No. 61/150,584, filed on Feb. 6, 2009.

(51) Int. Cl.
*G06Q 40/00* (2012.01)
(52) U.S. Cl. .......... 705/40; 705/30; 705/35; 705/39
(58) Field of Classification Search .......... 705/26.1, 705/35, 34, 39, 40, 7, 404
See application file for complete search history.

(56) References Cited

U.S. PATENT DOCUMENTS

| | | | |
|---|---|---|---|
| 6,932,268 B1 | 8/2005 | McCoy et al. | |
| 7,296,004 B1 * | 11/2007 | Garrison et al. | 705/404 |
| 7,490,063 B2 * | 2/2009 | Garrison et al. | 705/40 |
| 7,676,434 B2 * | 3/2010 | Evans | 705/40 |
| 2001/0037295 A1 * | 11/2001 | Olsen | 705/40 |
| 2001/0051917 A1 * | 12/2001 | Bissonette et al. | 705/39 |
| 2002/0111906 A1 * | 8/2002 | Garrison et al. | 705/40 |
| 2003/0216996 A1 * | 11/2003 | Cummings et al. | 705/39 |
| 2005/0177510 A1 * | 8/2005 | Hilt et al. | 705/40 |
| 2005/0192901 A1 * | 9/2005 | McCoy et al. | 705/40 |
| 2005/0234820 A1 * | 10/2005 | MacKouse | 705/40 |

(Continued)

FOREIGN PATENT DOCUMENTS

KR 10-2001-0056244 A 7/2001

(Continued)

OTHER PUBLICATIONS

Business Editors. "Phoenix Enhances Its Internet Banking Application With the Addition of Online Bill Payment Capabilities." Business Wire May 11, 1999 Business Dateline, ProQuest. Web. Jun. 9, 2012.*

(Continued)

*Primary Examiner* — Matthew Gart
*Assistant Examiner* — Olusegun Goyea
(74) *Attorney, Agent, or Firm* — Kilpatrick, Townsend & Stockton LLP

(57) ABSTRACT

Systems and methods for processing bill payments. A consumer may send a bill payment request online to a payment processing network, such as through an online bill payment interface. The payment processing network can coordinate with a non-bank acquirer to settle the bill payment with the biller. The liability for the transaction may fall on the issuer, who may be responsible for all parties fulfilling the transaction. The non-bank acquirer may coordinate among the various parties, but may not have liability for fulfillment of the transaction. The non-bank acquirer can deposit funds for the bill payment in a biller bank, and accounts receivable data can be sent to the biller for reconciliation of the bill.

23 Claims, 5 Drawing Sheets

U.S. PATENT DOCUMENTS

| | | | |
|---|---|---|---|
| 2006/0080243 A1* | 4/2006 | Kemper et al. | 705/40 |
| 2006/0085335 A1* | 4/2006 | Crawford et al. | 705/40 |
| 2006/0089877 A1* | 4/2006 | Graziano et al. | 705/14 |
| 2008/0059370 A1* | 3/2008 | Sada et al. | 705/40 |
| 2008/0183621 A1* | 7/2008 | Evans | 705/40 |
| 2009/0112747 A1* | 4/2009 | Mullen et al. | 705/35 |
| 2009/0138394 A1* | 5/2009 | Garrison et al. | 705/35 |
| 2009/0248538 A1* | 10/2009 | Taylor | 705/26 |
| 2009/0248555 A1 | 10/2009 | Sada et al. | |
| 2009/0313147 A1* | 12/2009 | Balasubramanian et al. | 705/30 |
| 2010/0049563 A1* | 2/2010 | Lopez Seco | 705/7 |
| 2010/0057552 A1* | 3/2010 | O'Leary et al. | 705/14.27 |
| 2010/0063893 A1* | 3/2010 | Townsend | 705/26 |

FOREIGN PATENT DOCUMENTS

| | | |
|---|---|---|
| KR | 10-2005-000643 A | 1/2005 |

OTHER PUBLICATIONS

Search/Examination Report dated Sep. 27, 2010 from International Application No. PCT/US2010/023299, 10 pages.

* cited by examiner

PUSH PAYMENT SYSTEM AND METHOD INCLUDING BILLING FILE EXCHANGE

CROSS-REFERENCES TO RELATED APPLICATIONS this patent application is a non-provisional of and claims priority to U.S. provisional patent application No. 61/150,584, filed on Feb. 6, 2009, which is herein incorporated by reference in its entirety for all purposes.

BACKGROUND

Many bills are paid in person at a biller or by mailing funds (e.g., in the form of a check) to the biller. Such methods can be inconvenient, time consuming, and expensive.

Another way to pay bills is to do it online. Paying bills online is convenient. In an online bill payment process, a consumer can go to an appropriate website and enter the biller name and payment amount, to pay the bill. When paying bills online, consumers can elect to pay using different models, such as the biller direct model or the consolidator model.

In the biller direct model, a consumer goes to the biller's website and sets up a payment using her payment method of choice. For example, in certain instances, the consumer may pay the biller with a credit card. Such transactions may resemble standard credit card purchases, with the biller acting as a merchant in an online transaction.

FIG. 5B can be used to illustrate the biller direct model. A consumer 930 may use a computer or other device to log onto a website of the biller 922 to pay a bill. After the consumer 930 is on the website, the consumer 930 may then choose to pay using a credit card 932. The consumer 930 may enter the credit card number or other identifying details of the credit card 932 into the website of the biller 922. The biller 922 can then generate an authorization request message, which can then be sent to the acquirer 925. (The acquirer 925 can be a bank that can reconcile account data and can also maintain one or more bank accounts for biller 922). After receiving the authorization request message, the acquirer 925 can then send the authorization request message (for the bill payment) to the payment processing system 926, which can then send it to the appropriate issuer 928. (The issuer 928 can be a bank that issues the credit card 932.) The issuer 928 can approve the authorization request message if the consumer 930 has sufficient credit, and an authorization response message can be sent back to the biller 922 via the payment processing system and the acquirer 925. At a later point in time, a normal clearing and settlement process can then take place.

The payments to the biller 922 can be one time or recurring payments. To encourage use of electronic payments, the biller 922 can use electronic billing, online customer service, and same day credit for payments to entice consumers.

Furthermore, since the acquirer has a relationship with the biller, the acquirer is responsible for ensuring that the biller fulfills its part of the transaction (e.g., ensuring that the biller provides the promised service or good to the consumer), and may offer refunds to the consumer in instances when the biller does not fulfill its part of the transaction.

Illustratively, the merchant can be a cable television provider. The consumer may pay for the cable service a month in advance, and the cable service to the consumer may be disrupted for two weeks of the month. The consumer may then dispute the bill payment of the cable television provider's bill using the consumer's payment card, since the consumer did not receive a full month's service. If the consumer paid with a payment card (such as one that is associated with an organization such as Visa™), the acquirer may be required to reimburse the consumer for the amount of money associated with the two weeks that the consumer did not receive service.

There are some problems with the biller direct model. For example, a consumer may have bills from multiple billers. For example, a consumer may have a power utility bill, a cable television bill, a water and sewage bill, a telephone bill, etc. The biller direct model requires a consumer to separately go to each biller's website to make a payment, which can be tedious and time consuming. Furthermore, many billers may not have a website set up for such payments, due to financial or technical limitations.

Another bill payment model is the consolidator model. The consolidator model is generally offered to consumers by their own financial institution and is an additional service that is provided with the financial institution's online banking service. Thus, in contrast to the biller model, which requires a consumer to log onto a separate website for each biller, the consolidator model may have the consumer log onto their own bank's website for all applicable bills. Consolidator model payments may also be referred to as online banking bill payments.

FIG. 5A shows an embodiment of a system according to the consolidator model. In the consolidator model, a consumer 800 opting to use this model can go through an initial set up process with their online bank 828. The consumer 800 can enter biller information (i.e., biller name, account number, mailing address, etc.) for each biller that they want to send payments to, on the appropriate website. The website may be with the online bank 828. Often, the online bank 828 may outsource many or all of the online banking bill payment functions to a third party consolidator, such as provider 824. Provider 824 can comprise a non-bank entity that coordinates among various banks and billers, and may provide websites and other technical functionality. In many instances when a consumer 800 logs onto a website of their online bank 828 to pay a bill, the consumer will be forwarded to a website of provider 824.

Once the consumer 800 has entered the payment information into the appropriate website, the provider 824 can coordinate the bill payment. The provider can transfer funds for the bill payment from the online bank 828 to a bank account maintained at the biller's bank 825. Funds can be transferred by means such as automated clearing house (ACH) payments, wire transfer, ePay, RPPS, etc. The provider 824 may also provide reconciliation data to the biller 822. This reconciliation data is required to let the biller 822 know that consumer 800 has made the bill payment. Often, payments may take from 2-5 business days to clear by this method, depending on connectivity between the provider 824 and the biller 822.

Most consolidator sites are "pay anyone" services, meaning that consumers can send payments to non-traditional billers (i.e., babysitter) or even to friends and family. Payments through the consolidator model are viewed as more convenient than the biller direct model because consumers can pay all bills through a single log-in session. However, payments made using the consolidator model can take longer to settle with the biller, depending on how the payment can be sent. The payments are often batched together with other payments, and may be sent to the biller daily or less frequently, again depending on biller connectivity and service level required. The additional time required for the biller reconciliation requires the consumer to schedule the payment to be made (and deduct the funds from their funding account) well in advance of the bill payment due date. The primary funding option for these payments is the consumer's checking account. A few online banking bill pay sites allow a savings account to be used as the funding source. In the consolidator model, payments are not made over a traditional card payment network (i.e., Visa, Mastercard, etc.) and thus cannot offer the benefits of such networks.

Better systems and methods to conduct bill payments are desirable. Embodiments of the invention address these and other problems, individually and collectively.

BRIEF SUMMARY

Embodiments of the invention include systems and methods for performing bill payment transactions using a non-bank acquirer.

One embodiment is directed to a method for making a bill payment to a biller, such as for a gas or electric power bill. The method comprises receiving a payment instruction message for making a payment using an account associated with a portable consumer device (e.g. a credit card). The payment instruction message can include biller information (such as the biller name or a customer's account number with the biller) relating to the biller. The method further comprises receiving a payment approval message from an issuer of the portable consumer device (e.g. a bank), generating, using a computer apparatus, an approved payment file, and sending the approved payment file to a non-bank acquirer. The approved payment file may be sent to the non-bank acquirer in a batch along with files for other payments.

Another embodiment is directed to a method, performed by a non-bank acquirer, for processing a bill payment for a biller using an account associated with a portable consumer device (e.g. a credit card or debit card). The method comprises receiving an approved payment file from an issuer of the portable consumer device, and the approved payment file can include biller information. The method also comprises parsing, using a computer apparatus, the approved payment file to determine a payment amount (e.g. the cost of the bill), accounts receivable data (e.g. payment reconciliation information, such as bill or customer number), and the biller information. The method further comprises the step of determining, using a computer apparatus, the biller from the biller information, providing the accounts receivable data to the biller, and providing the payment amount to a biller bank associated with the biller. The non-bank acquirer can originate the payments (on behalf of the online bank) and can ultimately settle the payments to the billers' bank account.

Another embodiment is directed to a method for making a bill payment to a biller using an account associated with a portable consumer device (e.g. a credit card).

The method comprises directing a web browser on a computer apparatus to a bill pay website and entering, using the computer apparatus, a payment request (e.g. filling out an online form) into the bill pay website for making the bill payment. The payment request can include biller information, and an issuer of the portable consumer device can approve the bill payment, and a non-bank acquirer can receive an approved payment file for the bill payment, upon the approval of the bill payment.

These and other embodiments of the invention are described in further detail below with reference to the drawings and the Detailed Description.

DETAILED DESCRIPTION

Figure 1:
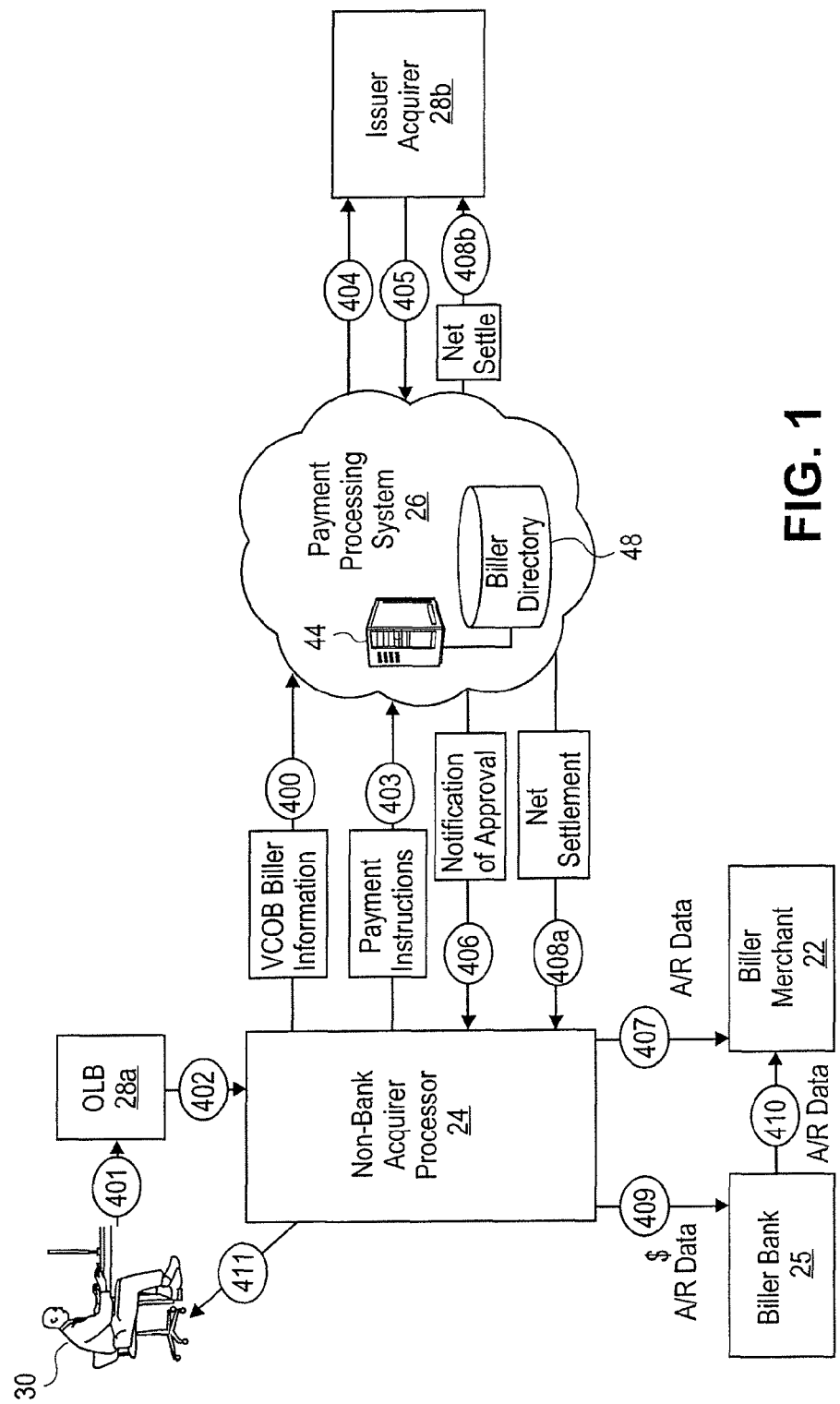
FIG. 1 is a flowchart illustrating a method according to an embodiment of the invention.

Embodiments described herein relate to systems and methods for bill payments using portable consumer devices. An example of a portable consumer device can be a payment card issued by a bank and used by consumers to make purchases of goods or services. A consumer can log into a centralized website, create or select a list of billers to make payments to, and can choose to pay the billers by using an account associated with the consumer's portable consumer device.

In some portable consumer device transactions (e.g., purchase transactions to buy goods at a merchant), a consumer can use a payment card such as a credit or debit card. In an exemplary payment transacting using a payment card, a merchant's payment terminal can read the card, and send the card information, along with other transaction information (price, etc) to the merchant's acquirer. The acquirer is typically a bank that manages an account for the merchant, and can coordinate card payments. The acquirer can forward the transaction information to the consumer's bank by way of a payment processing system, such as VisaNet™ or Banknet™. The bank that issued the payment card can send a reply message to the acquirer that authorizes the transaction. The acquirer can then deposit the appropriate funds for the transaction into the merchant's bank account, and alert the merchant that the transaction is authorized.

Embodiments described herein can allow a consumer to use an account associated with a payment card or other portable consumer device to pay bills online, in a coordinated and simple manner. Some online bill payment systems and methods are also described in U.S. patent application Ser. No. 11/217,691, filed on Aug. 31, 2005 and U.S. Provisional Application No. 60/606,594, filed on Sep. 1, 2004, which are herein incorporated by reference in their entirety for all purposes.

In an exemplary embodiment, a consumer may have a portable consumer device, such as a credit card, issued by a financial institution (the "issuer"). To pay a utility bill, the consumer may direct their web browser to the issuer website, such as an online banking website. After logging in, the consumer may choose to pay bills. In one aspect of the embodiment, the issuer website may forward the user to a website of a third party provider. This third party provider may be a "non-bank acquirer" in that it may perform certain functions performed by an acquirer in the example described above, but may not be a financial institution (e.g., not a bank) that holds an account of the merchant or consumer. In certain jurisdictions, financial institutions may be governed by specific government regulations and operating requirements. The non-bank acquirer may not be governed in such manner.

Once the consumer is on the website, the consumer can then enter a payment request into the website. The consumer can choose the biller to be paid, and the method of payment. The consumer may then enter their credit card information, or such information may already be stored with the website and/or with the issuer. The non-bank acquirer may generate a payment instruction message from the information entered by the consumer. This payment instruction message can be batched together with other payment instruction messages, and then sent to a payment processing system. The payment processing system can then separately route each payment instruction message to the appropriate issuer, which can in turn approve any received payment instruction messages. Once the non-bank acquirer receives the approval for the bill payment, it can settle the bill, such as by using the payment processing system. This can comprise sending the biller a notification that the payment has been authorized and is good or guaranteed for payment. At that point the biller can "post" the payment to the consumer's account, giving the consumer credit for the payment, which may be prior to receiving funds for the payment. The payment processing system can settle payments on a daily or other periodic basis. Once the payment processing system completes the settlement process (i.e., moves funds from the issuer to the non-bank acquirer for the card based online banking bill payments initiated that day or at other times), the non-bank acquirer may provide the funds for the bill payment to the biller's bank, and may alert the biller that the bill has been paid.

Specific embodiments can be described with reference to the drawings.

I. Exemplary Systems and Methods

FIG. 1 shows a system and method according to an embodiment. Other systems according to embodiments of the invention may include fewer or more components or steps than are specifically shown in FIG. 1.

FIG. 1 shows a consumer 30, a biller 22, a biller bank 25, an online bank (OLB) 28a, a non-bank acquirer 24, a payment processing system 26, and an issuer 28b, in operative communication with each other. The non-bank acquirer 24 and the issuer 28b can communicate through the payment processing system 26. As described above, an "issuer" is typically a business entity (e.g., a bank) which maintains financial accounts for the consumer and often issues a portable consumer device such as a credit or debit card to the consumer. In exemplary embodiments, the issuer 28b can include the OLB 28a (i.e., the OLB 28a is part of the issuer 28b), or the issuer 28b and the OLB 28a may be related entities. For example, OLB 28a may comprise a website run by issuer 28b. In other embodiments, issuer 28b and OLB 28a may be unrelated. A "biller" is typically an entity that can provide goods or services to a consumer, such as within an ongoing service cycle that is known and agreed upon by both parties. Examples of such a biller can include a service provider, government entity, utility company, store, supplier, merchant, person, etc. The biller 22 can have a bank account with a biller bank 25.

In a typical bill payment transaction, a consumer 30 (which may be a person, corporation, or other type of entity) may order goods or services from the biller 22, and may receive a bill for the goods or services from the biller 22. The biller 22 might be a utility and the services provided to the consumer 30 may be electricity and water. The bill may be a utility bill showing the consumer's monthly charge for utilities. In a specific example, the utility bill may be $200 for the month of January.

The consumer 30 can then send a payment instruction message for the payment of the purchase to the biller 22 using the OLB 28a. The OLB 28a may have a world-wide-web based website (using HTML or other programming) or other suitable online presence. The OLB 28a can forward the consumer 30 to a website hosted by non-bank acquirer 24, which can be a third party provider or other type of acquirer processor. The non-bank acquirer 24 can maintain relationships among the various parties, and can coordinate payment transactions along with the payment processing system 26.

As used herein, a "non-bank acquirer" can be a business entity that is not a commercial bank. The non-bank acquirer 24 can have a business relationship with a particular biller 22 and its associated biller bank 25. The non-bank acquirer 24 may include various databases and one or more computer apparatuses as described below. The computer apparatuses of the non-bank acquirer 24 may comprise a computer readable medium comprising code for processing transactions as detailed below, including code for processing a bill payment for a biller 22 using an account associated with a portable consumer device. In one aspect, the code can be executable by a computer apparatus, and can include code for receiving an approved payment file from an issuer of the portable consumer device, the approved payment file including biller information. The computer readable medium may also include code for parsing, using a computer apparatus, the approved payment file to determine a payment amount, accounts receivable data, and the biller information, code for determining, using a computer apparatus, the biller 22 from the biller information, and code for providing the accounts receivable data to the biller 22. The computer readable medium may also include code for providing the payment amount to a biller bank 25 associated with the biller 22.

The non-bank acquirer 24 can maintain websites for financial institutions, or portions of websites (such as related to bill payments), and can coordinate the payments between various financial institutions. Since the non-bank acquirer 24 is not a bank, it may have no liability for the biller 22 fulfilling the transaction. In certain embodiments, the non-bank acquirer 24 may not be responsible to the consumer 30 for any part of the transaction if the transaction is not fulfilled. In other embodiments, the non-bank acquirer 24 may be responsible for settlement of funds to the consumer 30 (such as once the non-bank acquirer has settled the funds with the payment processing system 26), but not be responsible should the biller 22 not fulfill the transaction.

Illustratively, a consumer 30 may send a bill payment to biller 22 for a particular service, but the biller 22 may not provide the service. For example, the biller may be an exterminator and the bill may be for an exterminator service that was to be provided to the consumer. However, the exterminator may not have performed a scheduled service for the consumer due to an error on the part of the exterminator (e.g., poor scheduling). Even though the consumer did not receive the exterminator service, the consumer went ahead and initiated payment to the biller. The non-bank acquirer 24 will have transferred funds from the consumer 30 (i.e. the consumer's bank account) to the biller 22 (i.e. the biller's bank account), at the request of the consumer. However, the liability for the transaction in this case can lie with the issuer 28b. Thus, in this case, the issuer 28b may be responsible for ensuring that the biller fulfills the transaction, such as if the consumer has dispute rights for these types of payments. The issuer 28b may choose to provide a full or partial refund of the bill payment, may provide discounts or coupons for other goods or services, or may coordinate with other billers to provide equivalent services. As such, the consumer can use the system of FIG. 1 with reduced concern for fraud or other problems with the transaction. In certain implementations, there may be a limited set of consumer disputes (e.g. processing errors) for which the issuer 28b has liability. In certain implementations, the consumer may settle the matter directly with the biller (i.e., request a refund from the biller for services not rendered but payment received).

The consumer 30 may be an individual, or an organization such as a business that is capable of purchasing goods or services.

The payment processing system 26 may have a server computer 44, as well as a biller directory 48. The server computer 44 is typically a powerful computer or cluster of computers. For example, the server computer can be a large mainframe, a minicomputer cluster, or a group of servers functioning as a unit. In one example, the server computer may be a database server coupled to a web server. The server computer may comprise a computer readable medium comprising code for processing transactions as detailed below, including code for receiving messages from billers, non-bank acquirers, and issuers, code for determining billers using biller information, code for sending messages, and code for clearing and settling transactions.

The server computer 44 may also comprise a computer readable medium comprising code, executable by a computer apparatus (such as a computer server), for receiving a payment instruction message for making a bill payment using an account associated with an issuer, parsing batch files, and otherwise performing the functions described herein.

The payment processing system 26 may comprise or use a payment processing network such as VisaNet™ or Banknet™. The payment processing system 26 and any communication network that communicates with the payment processing system 26 may use any other suitable wired or wireless network, including the Internet. The payment processing system 26 may be adapted to process ordinary debit or credit card transactions, along with bill payment transactions as contemplated herein.

The biller directory 48 can be used to determine the identity of the biller in a transaction. The website used by a consumer 30 may access a list of billers from biller directory 48, to let the consumer determine which biller to send a payment to, and which billers accept which types of payments. Thus, transactions may be initiated by consumer 30. The biller directory 40 may be embodied by one or more databases. In certain embodiments, the biller directory 40 can be a part of payment processing system 26, such that portions of the payment processing system 26 can perform some or all of the functions of biller directory 40. In some embodiments, the biller directory 40 can be a separate network or computer system in communication with payment processing system 26. In another aspect, the biller directory 40 may comprise a portion of the issuer 28b. In certain implementations, biller directory 40 can comprise multiple databases of information located on various independent computer systems in communication with each other.

The consumer 30 can use a computer apparatus to communicate with the OLB 28a or non-bank acquirer 24. The computer apparatus can be an access device according to embodiments of the invention, which can be in any suitable form. Examples of access devices include cellular phones, PDAs, personal computers (PCs), tablet PCs, handheld specialized readers, set-top boxes, and the like. The computer apparatus may comprise a convenient interface such as a web browser on a computer that communicates over the Internet. In certain embodiments, the consumer 30 may have a portable consumer device, such as a payment card, associated with accounts provided or maintained by the issuer 28b. In one aspect, the payment card can interact with the computer apparatus (such as by entering into a card reader) to create a payment instruction message to send. In other aspects, the payment card can contain the relevant payment account information. The consumer 30 can provide the relevant payment account information that is contained on the payment card to computer apparatus or to a website accessed thereon.

For example, the consumer 30 can direct a web browser on a computer apparatus to a bill pay website. The consumer 30 can then enter, using the computer apparatus, a payment request (that can include biller information) into the bill pay website for making the bill payment. The issuer of the portable consumer device can approve the bill payment, and the non-bank acquirer 24 can receive an approved payment file for the bill payment, upon the approval of the bill payment.

For simplicity of illustration, one consumer 30, one online bank 28a, one biller 22, one biller bank 25, one non-bank acquirer 24, and one issuer 28b are shown. However, it is understood that in embodiments of the invention, there can be multiple consumers, billers, biller banks, non-bank acquirers, issuers, as well as server computers or other computer apparatuses, databases, accounts, etc.

Referring to FIG. 1, a flow diagram is shown of an exemplary transaction process performed by the above described system. In certain embodiments, the transaction processes may differ, depending on the nature of the transaction and the specific parties involved.

In step 400, the non-bank acquirer 24 can transmit biller information to payment processing system 26. Step 400 may typically occur prior to an online bill payment transaction by consumer 30, but may also occur during or after such transaction. The information transmitted in step 400 may include a biller identifier that is used to identify a biller that is set up for bill payments with non-bank acquirer 24 (i.e., a supported biller). The payment processing system 26 can populate the biller directory 40 with the supported billers. The biller directory 40 can be data stored on a computer database that indicates which billers have bank accounts with specified biller banks, which billers accept payment transactions using portable consumer devices, and provide other biller data such as contact information. For example, Bank of America may be associated with certain billers and Wells Fargo may be associated with another set of billers. Thus, the biller directory 40 can be used by the payment processing system 24 and the non-bank acquirer 24 in coordinating bill payments initiated by the consumer 30.

In step 401, a consumer 30 can initiate a bill payment transaction. In exemplary embodiments, the consumer 30 can use a computer apparatus to log onto a website of OLB 28a. The OLB 28a website may be maintained by issuer 28b, or by another entity. OLB 28a website can then direct the consumer 30 to a website maintained by non-bank acquirer 24 in step 402. In exemplary embodiments, the website of the non-bank acquirer 24 may appear similar to the OLB 28a website and may refer by name to the issuer 28b. This is done to make the experience familiar for the consumer, reducing the need for the consumer to learn a new website format as the consumer 30 is interacting with different entities. Furthermore, the continuity of website styles can assure the consumer that the non-bank acquirer website is officially sanctioned by the issuer 28b.

The consumer may enter a bill payment request into the website of non-bank acquirer 24. For example, the consumer 30 can choose from a list of billers on the website, enter bill information (the customer account number the consumer 30 has with biller 22, bill amount, etc.) and enter payment information. Payment information can include an identifier for an account the consumer 30 has for a portable consumer device from issuer 28b, or other account information. In some implementations, any or all of the information entered as the bill payment request may already be stored in a database. For example, non-bank acquirer 24 may have access to the consumer's payment information, such that the payment information can be chosen by the consumer 30 from a website list of payment information. In another example, the bill information may be displayed on the website, and the consumer 30 can enter the payment request by selecting the displayed bill.

The non-bank acquirer 24 can use a computer apparatus to generate a payment instruction message from the bill payment request, which can include biller information. The payment instruction message can be sent to payment processing system 26 (step 403) The payment instruction message can include, for example, the biller information, amount of the bill payment, account identifier (such as a credit card number or other identifier), other suitable account details (such as an expiration date and security codes), an account number that the consumer 30 may have with the biller 22, and any other suitable information. In an example, the payment instruction message can be for the payment of a cable television bill. Such payment instruction message may include the biller information (i.e. the name of Comcast Corporation), the number and expiration date of the credit card used to pay the bill, the amount of the bill (i.e. $100), and the account number assigned to the customer by Comcast Corporation.

In some embodiments, the payment instruction message may be in a generic computer format such as XML. In certain embodiments, the non-bank acquirer 24 may group together (i.e., "batch") payment instruction messages before sending them to the payment processing system 26. The payment instruction messages may be batched together in a "batch file" for sending in aggregate. The batch file may comprise an electronic message containing each individual payment instruction message, or may be other suitable formats (compressed computer file, etc.). In one example, the payment instruction message may be a first payment instruction message, and may be batched with a plurality of payment instruction messages into a single batch file. Each payment instruction message may be for a separate bill payment transaction. Thus, the batch file may contain payment instruction messages for a plurality of different billers, from a plurality of different consumers. In other embodiments, the non-bank acquirer 24 may not use a batch file, but may send the payment instruction messages to the payment processing system 26 in real time, or in "near" real time. In these embodiments, the payment instruction message may be sent within minutes, such as 5 or 30 minutes, after being generated.

The non-bank acquirer 24 may send a separate batch file to the payment processing system 26 at certain times during the day (e.g., at least twice per day and not more than 48 times per day). For example, a batch file may be created and sent every two hours, so that a batch file is sent 12 times a day. Any bill payment request that is received after the non-bank acquirer 24 sends a batch file can be sent as part of the next batch file, two hours later. In some implementations, a batch file may be sent one or more times a day, such as 10 times a day. In other implementations, a batch file may be sent at different intervals, such as a few times a week, once a day, two times a day, three times day . . . eight times a day, ten times a day, a dozen times a day, once every hour, etc. In some embodiments, unlike traditional credit card processing, bill payment requests are not sent to the payment processing system 26 from the non-bank acquirer 24 as they come in. Also, unlike traditional check transactions, the batch files are processed more frequently than once per day (i.e., one or more times per day).

The payment processing system 26 can receive the payment instruction message (step 403). In exemplary embodiments, the payment instruction message may be a first payment instruction message, and may be received in a batch file with a plurality of payment instruction messages associated with other consumers and/or billers. The payment processing system 26 can use a server computer or other apparatus to parse the batch file to determine each payment instruction message. Each payment instruction message may include identifying information for an appropriate issuer.

The payment processing system 26 can then send each payment instruction message to the appropriate issuer in step 404. For example, the consumer 30 may have chosen to pay his bill with a credit card or debit card account with Bank A, so that Bank A is the issuer 28*b*. The payment processing system 26 can send the first payment instruction message to Bank A (i.e., issuer 28*b*) in step 404. Other payment instruction messages in the plurality of payment instruction messages may be for bill payments using other issuers (e.g. Bank B, Bank C, etc.), and the payment processing system 26 can send each of those payment instruction messages to the appropriate issuer. Thus, a second payment instruction message may be sent to Bank B, a third payment instruction message may be sent to Bank C, and so on.

In certain embodiments, the payment processing system 26 can add or remove data from the payment instruction message, before sending to an issuer. Thus, the payment processing system 26 can send each payment instruction message as part of an authorization request message to the issuer in step 404. The authorization request message can include the payment instruction message, and any suitable additional data. For example, the payment processing system may compare the biller information within the payment instruction message to data within the biller directory 40. The payment processing system 26 can add further data regarding the biller (such as biller name or a biller identifier) to the payment instruction message, and may also review the message to ensure that the biller is configured to handle bill payments using portable consumer device. The payment processing system 26 may send the payment instruction message as an authorization request message that may comprise a format that can be processed by issuer 28*b*. For example, different non-bank acquirers or OLB websites 28*a* may send payment instruction messages in different formats. Payment processing system 26 can be configured to send a payment instruction message as an authorization request message having a format that can be processed by issuer 28*b*, such as a format 0200 message. The issuer 28*b* can then receive and process the authorization request message.

The issuer 28*b* can review the payment instruction message and can determine whether to approve or decline the bill payment. The issuer 28*b* can generate a response message (e.g. a payment approval message) that indicates whether the request is approved or declined and sends the response message to payment processing system 26 in step 405. In one embodiment, the response message may be a format 0210 message.

The payment processing system 26 can determine whether the payment approval message indicates that the transaction was approved or declined. If the bill payment is declined, the payment processing system 26 can send a message indicating that the transaction was declined to the non-bank acquirer 24, which can record that the bill payment was declined, and may forward the message indicating that the bill payment was declined to the consumer (step 411).

If the bill payment transaction was approved by the issuer 28*b*, the payment processing system 26 can generate an approved payment file. The approved payment file can include remittance information (e.g. the payment amount) and any other information that is needed to settle the bill payment transaction, such as a biller identifier or other biller information from the biller directory 40. For example, the approved payment file can include the payment amount, accounts receivable data (which can allow the biller to reconcile the payment with the services or goods provided), and biller information (such as the biller name or a biller identifier). The payment processing system 26 can then send the approved payment file to the non-bank acquirer 24 in step 406.

After the issuer 28b has approved the bill payment, the non-bank acquirer 24 can receive the approval. The approval for the bill payment transaction can come from the issuer 28b via the payment processing system 26 transmitting the approved payment file.

As described above, in some traditional portable consumer device transactions, the payment approval message is only sent to an acquirer. In certain embodiments of the system and methods described herein, there is no acquirer (i.e., a "bank" acquirer). A bill payment transaction approval can be sent to a non-bank acquirer 24, which can coordinate directly with the biller 22, and may also coordinate with a biller bank 25. In some embodiments, neither the non-bank acquirer 24 nor the biller bank 25 has liability for the transaction. Such liability can fall to the issuer 28b. This system can leverage the relationships and infrastructure of non-bank acquirer 24, which can make it easier for various billers and other entities to provide bill payment services with portable consumer devices. Furthermore, such a system allows for a fast and efficient method of coordinating bill payments and accounts receivable data, as will be described in greater detail below.

The non-bank acquirer can 24 parse the approved payment file, to determine transaction information. For example, the non-bank acquirer may parse the approved payment file to determine the payment amount, accounts receivable data (which can allow the biller to reconcile the payment with the services or goods provided), and biller information (such as the biller name or a biller identifier). The non-bank acquirer 24 can determine the biller 22 from the biller information. The non-bank acquirer 24 may also determine the biller bank 25 associated with the biller 22 from the biller information, from internal records relating to biller 22, or by other suitable methods.

In step 407, the non-bank acquirer 24 can send the accounts receivable data to the biller 22. This will let the biller 22 know that a payment on the bill has been made, and the account of the consumer 30 with biller 22 may also be debited to reflect the payment. In certain embodiments, the non-bank acquirer 24 can send the accounts receivable data directly to the biller in step 407. In other embodiments, the non-bank acquirer 24 can send the accounts receivable data to the biller 22 through the biller bank 26. In these embodiments, the non-bank acquirer 24 can send the accounts receivable data to biller bank 26, which in turn can forward the accounts receivable data to the biller 22.

Also after the issuer 28b has approved the bill payment, the payment processing system 26 can settle the transaction. In steps 408a and 408b, the payment processing system can settle the funds between non-bank acquirer 24 and issuer 28b, respectively. In exemplary embodiments, such settlement can occur after the biller 22 has received the accounts receivable data in step 407. In other embodiments, the settlement steps 408a, 408b can occur before or during the sending of the accounts receivable data in step 407. In certain embodiments, the payment processing system 26 can settle with the non-bank acquirer 24 (in step 408a) at a different time than the settlement with the issuer 28b (in step 408b).

The payment processing system 26 can transfer the funds for the bill payment to the biller bank 25 in step 409. The payment processing system 26 can also transmit data regarding the bill payment, such as the accounts receivable data (in step 409) or at other suitable times. The biller bank 25 can settle the transaction with biller 22. The biller bank 25 may be an entity that manages accounts for biller 22. When biller bank 25 receives the funds in step 409, it can deposit the money into an account for biller 22. In step 410, the biller bank 25 can transmit the accounts receivable data to the biller 22 so that the biller will know that a bill payment has been made, for how much, for which specific bill, etc. In certain implementations, the biller bank 25 can manage the bank account for the biller 22 and keep records of received bill payments.

In step 411, the non-bank acquirer 24 can send a message to the consumer 30. The message can alert the consumer to the successful bill payment, and can include other transaction information such as a transaction identifier. The issuer 28b may bill the user for the transaction, such as by sending a portable consumer device statement with the amount associated with the bill payment at a later time. This may be performed in real-time or at certain intervals, such as in a batch process (e.g., at the end of the day).

Figure 2:
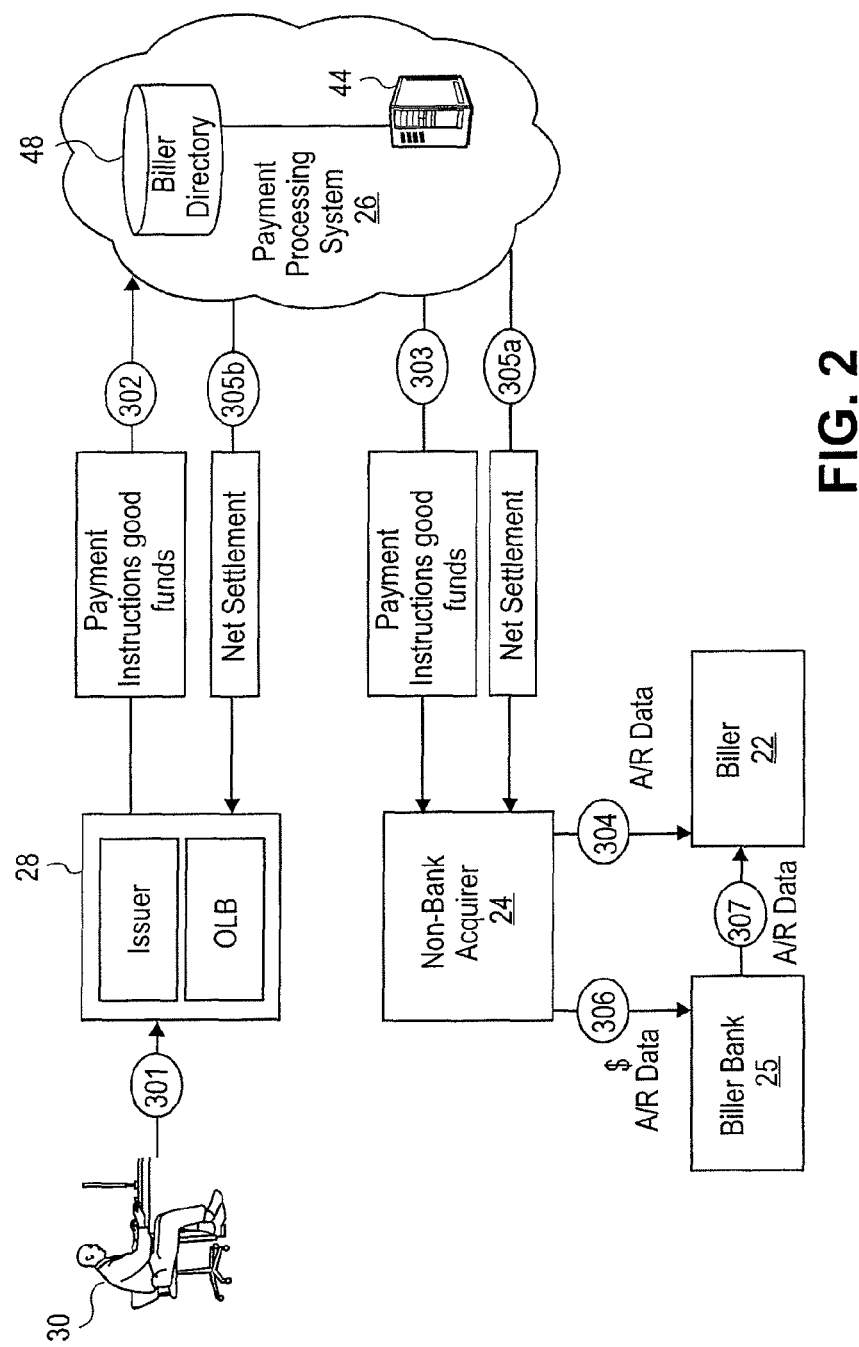
FIG. 2 is a flowchart illustrating a method according to an embodiment of the invention.

FIG. 2 depicts an embodiment in which the issuer 28 may manage more of the online banking bill payment service. In this embodiment, the issuer 28 may maintain the OLB website. In the embodiment of FIG. 1, the issuer 28b may maintain the OLB website 28a as seen in the embodiment of FIG. 2, or the OLB website 28a may be maintained by an alternate party. The OLB website of the issuer 28 can coordinate with the payment processing system 26 directly. In step 301, the consumer can schedule a bill payment transaction by using a computer apparatus to log into the OLB website of issuer 28. The OLB website can authenticate the consumer 30, who can then enter a bill payment request. The bill payment request may be entered in a similar fashion as in the method of FIG. 1, or by other suitable method. The bill payment can be for a bill from participating biller 22, and can be scheduled for payment using a portable consumer device account.

The issuer 28 can hold and guarantee funds for the scheduled bill payment in exemplary embodiments, and can generate a payment instruction message from the bill payment request. In exemplary embodiments, the issuer 28 will have a copy of, or access to, biller directory 48. Thus, the issuer 28 can be aware of which billers are configured to receive bill payments by portable consumer device, and can include biller information in the payment instruction message.

In step 302, the issuer 28 can send the payment instruction message to payment processing system 26. The payment instruction message can include, for example, the biller information, amount of the bill payment, account identifier (such as a credit card number or other identifier), other suitable account details (such as an expiration date, issuer identifying information, and security codes), an account number that the consumer 30 may have with the biller 22, and any other suitable information. In one aspect, the payment instruction message may comprise a generic computer format such as XML. In exemplary embodiments, the payment instruction message sent in step 302 may also contain a payment approval message. As the OLB website is maintained by the issuer 28, the issuer 28 may approve the transaction once the consumer 30 has entered a bill payment request. This can save time, as the process flow can be shortened. Furthermore, this can prevent some processing of payment instruction messages that do not have sufficient funds to pay the bill.

A server or other apparatus in the payment processing system 26 can review the payment instruction message, and can perform any suitable format conversions or other data processing. The server in the payment processing system 26 can generate an approved payment file, as the transaction has already been approved by the issuer.

The payment processing system 26 can send the payment instruction message to the non-bank acquirer 24 in step 303. The payment instruction message in step 303 can include the approved payment file. The payment instruction message can include biller information, and suitable data such as identifying information for the biller bank 25. If the non-bank acquirer 24 has a direct connection to biller 22, upon receipt of the payment instruction message, the non-bank acquirer 24 can remit accounts receivable data to biller 22 in step 304. This will let the biller 22 know that a payment on the bill has been made, and the account of the consumer 30 with biller 22 may also be debited to reflect the payment. As such, biller 22 can use the accounts receivable data for posting to the biller account associated with consumer 30.

The payment processing system 26 can settle the transaction after receiving the payment approval message from issuer 28. In steps 305a and 305b, the payment processing system 26 can settle the funds between non-bank acquirer 24 and issuer 28, respectively. In exemplary embodiments, such settlement can occur after the biller 22 has received the accounts receivable data in step 304. In one implementation, settlement step 305a, 305b, may occur the same day as the sending of the accounts receivable data in step 304. In other embodiments, the settlement steps 305a, 305b can occur before or during the sending of the accounts receivable data in step 304. In certain embodiments, the payment processing system 26 can settle with the non-bank acquirer 24 (in step 305a) at a different time than the settlement with the issuer 28b (in step 305b). The non-bank acquirer 24 can in turn net settle with the biller bank 25, in step 306. Thus the non-bank acquirer can transfer the funds for the bill payment. In certain implementations, the non-bank acquirer 24 may also transmit data, such as the accounts receivable data, in step 306 or at other suitable times. At step 307, the biller bank 25 can transmit the accounts receivable data to the biller 22 for posting to the consumer's account. The biller bank 25 can deposit the payment into an account associated with the biller 22, and can otherwise settle the transaction with biller 22.

Once the transaction has settled, the issuer 28 can alert the consumer to the successful bill payment, and can provide other transaction information such as a transaction identifier. The issuer 28 may bill the user for the transaction, such as by sending a portable consumer device statement with the amount associated with the bill payment at a later time. This may be performed in real-time or at certain intervals, such as in a batch process (e.g., at the end of the day).

In certain embodiments described herein, the bill payment is originated by an entity other than the biller 22. These embodiments offer the advantage of allowing consumers to use portable consumer devices to initiate bill payments. Certain embodiments described herein are different from using a portable consumer device at a biller's website. Embodiments of the present invention can direct bill payments to a biller, without initiation by the biller. This provides consumers with different payment options, and billers are provided with an alternative way to collect receivables from consumers. This can reduce the complexity of prior systems, as billers may not need to be concerned with maintaining payment infrastructures.

Also, certain embodiments of the system and method have no acquirer in the system or methods. The bill payment can be processed by a non-bank acquirer.

Accordingly, embodiments of the systems and methods provided herein can be efficient ways to process online bill payment requests using a portable consumer device. The transaction can be processed as a portable consumer device transaction and not using an ACH transaction or other non-portable consumer device transactions. Payment transactions using portable consumer devices such as credit and debit cards also have tools including improved fraud analysis tools, rewards, and real time notification of payment that ACH transactions do not have. Embodiments of the invention can also use such tools.

Embodiments disclosed herein also have additional technical advantages. For example, the number of participants/intermediaries can be minimized, to increase the speed at which all activities occur (such as payment and settlement). Thus, payments and reconciliation can happen faster, such as in real time or near real time. This allows consumers and billers to maintain more accurate records and accounting. Furthermore, in certain embodiments, payment instruction messages may be sent in batches to a payment processing system. The payment processing system may then parse the batch to process each payment instruction request individually. These embodiments therefore combine the speed and data efficiency of batching with fraud detection and other advantages of individualized processing. In certain embodiments, only "good funds" (i.e., funds that are authorized by the issuer) may be sent to the biller. This can reduce cost to the biller associated with returned items due to insufficient funds. This also increases the billers' opportunity to collect more payments, and may prevent the biller from providing services without remuneration.

II. Portable Devices and Computer Apparatuses

Figure 3A:
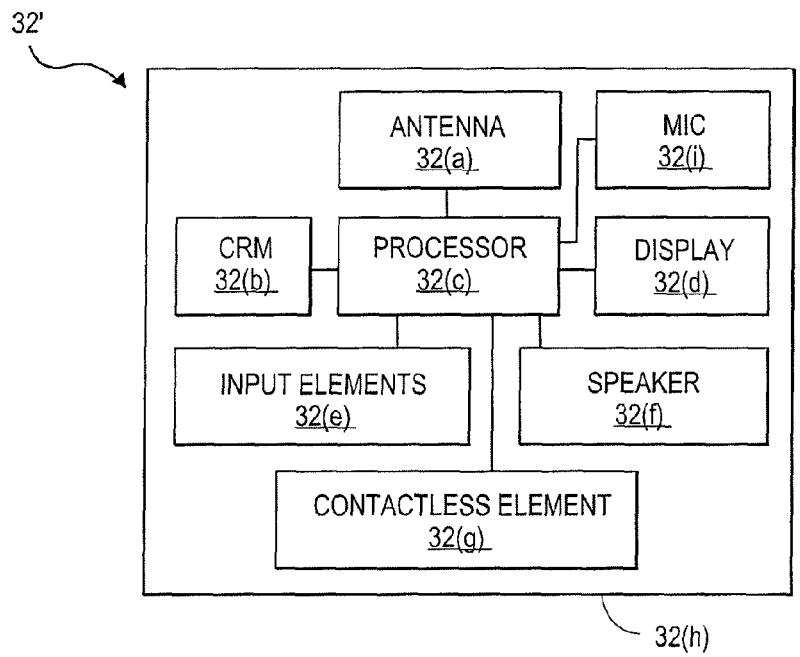
FIGS. 3(a)-3(b) show block diagrams of portable consumer devices.
Figure 3B:
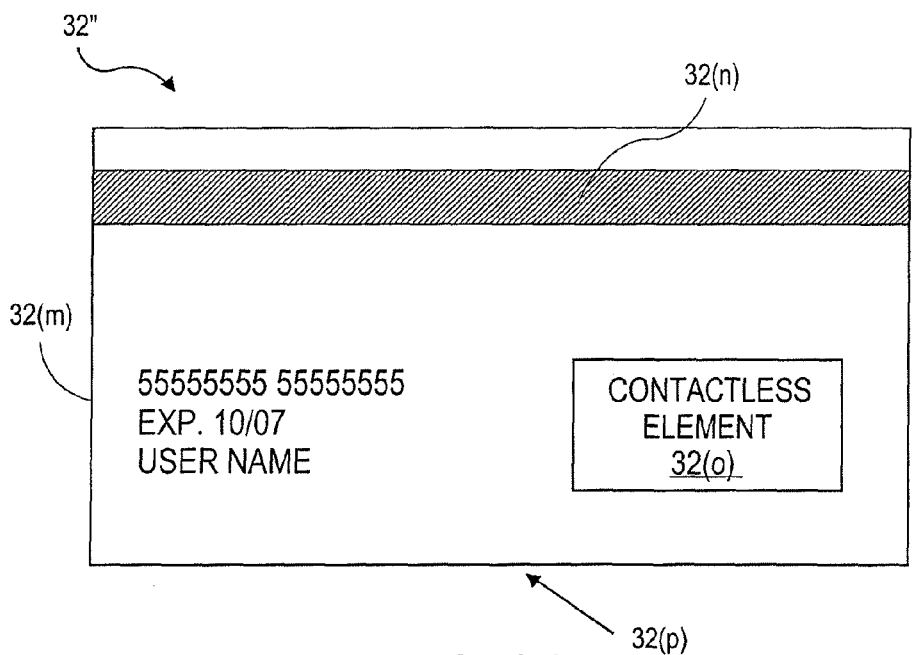

FIGS. 3(a)-3(b) show block diagrams of portable consumer devices and subsystems that may be used in some embodiments.

Accounts associated with the portable consumer device may be used for bill payments. In certain embodiments, the consumer may conduct a bill payment transaction over a computer network (such as by using a bill payment website). For such online transactions, the physical portable consumer device may not be necessary, as only the information contained on the portable consumer device (account identifier, expiration date, security code, etc.) may be required to be entered. In other embodiments, a portable consumer device may be physically used in the transaction. For example, the consumer may have a computer apparatus that includes a portable consumer device reader, such as a magnetic stripe reader or smart chip reader. Embodiments of the portable consumer device itself may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor) such as payment cards, keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value or prepaid devices (e.g., a stored value card).

An exemplary portable consumer device 32' in the form of a phone may comprise a computer readable medium and a body as shown in FIG. 3(a). (FIG. 3(a) shows a number of components, and the portable consumer devices according to embodiments of the invention may comprise any suitable combination or subset of such components.) The computer readable medium 32(b) may be present within the body 32(h), or may be detachable from it. The body 32(h) may be in the form a plastic substrate, housing, or other structure. The computer readable medium 32(b) may be a tangible memory that stores data and may be in any suitable form including a magnetic stripe, a memory chip, encryption algorithms, private keys, etc. The memory also preferably stores information such as financial information, transit information (e.g., as in a subway or train pass), access information (e.g., as in access badges), etc. Financial information may include information such as bank account information, bank identification number (BIN), credit or debit card number information, account balance information, expiration date, consumer information such as name, date of birth, etc.

Information in the memory may also be in the form of data tracks that are traditionally associated with credit cards. Such tracks include Track 1 and Track 2. Track 1 ("International Air Transport Association") stores more information than Track 2, and contains the cardholder's name as well as account number and other discretionary data. This track is sometimes used by the airlines when securing reservations with a credit card. Track 2 ("American Banking Association") is currently most commonly used. This is the track that is read by ATMs and credit card checkers. The ABA (American Banking Association) designed the specifications of this track and all world banks must abide by it. It contains the cardholder's account, encrypted PIN, plus other discretionary data.

The portable consumer device 32' may further include a contactless element 32(g), which is typically implemented in the form of a semiconductor chip (or other data storage element) with an associated wireless transfer (e.g., data transmission) element, such as an antenna. Contactless element 32(g) is associated with (e.g., embedded within) portable consumer device 32' and data or control instructions transmitted via a cellular network may be applied to contactless element 32(g) by means of a contactless element interface (not shown). The contactless element interface functions to permit the exchange of data and/or control instructions between the mobile device circuitry (and hence the cellular network) and an optional contactless element 32(g).

Contactless element 32(g) is capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the portable consumer device 32 and an interrogation device. Thus, the portable consumer device 32 is capable of communicating and transferring data and/or control instructions via both cellular network and near field communications capability.

The portable consumer device 32' may also include a processor 32(c) (e.g., a microprocessor) for processing the functions of the portable consumer device 32' and a display 32(d) to allow a consumer to see phone numbers and other information and messages. The portable consumer device 32' may further include input elements 32(e) to allow a consumer to input information into the device, a speaker 32(f) to allow the consumer to hear voice communication, music, etc., and a microphone 32(i) to allow the consumer to transmit her voice through the portable consumer device 32'. The portable consumer device 32' may also include an antenna 32(a) for wireless data transfer (e.g., data transmission).

Portable consumer device 32' may be used by a consumer to schedule bill payment transactions. For example, portable consumer device 32' may comprise a smart phone with Internet access capabilities. In such example, portable consumer device 32' will also comprise the computer apparatus that the consumer can use to access an online bank. In one aspect, the portable consumer device 32' may have a web browser that can access an online bank website. In another aspect, the portable consumer device 32' may have a specialized transaction application that can schedule bill payments. The specialized transaction application may comprise code stored on computer readable medium 32(b) and executable on processor 32(c). In some implementations, portable consumer device 32' can include an interface to allow the consumer to create a payment request. The portable consumer device 32' can then send the payment request to an issuer or payment processing system using contactless element 32(g) or over wireless communications including cellular internet access, Wi-Fi, WiMAX, etc.

An example of a portable consumer device 32" in the form of a payment card is shown in FIG. 3(b). FIG. 3(b) shows a plastic substrate 32(m). A contactless element 32(o) for interfacing with an access device 34 may be present on or embedded within the plastic substrate 32(m). Consumer information 32(p) such as an account number, expiration date, and consumer name may be printed or embossed on the card. Also, a magnetic stripe 32(n) may also be on the plastic substrate 32(m).

As shown in FIG. 3(b), the portable consumer device 32" may include both a magnetic stripe 32(n) and a contactless element 32(o). In other embodiments, both the magnetic stripe 32(n) and the contactless element 32(o) may be in the portable consumer device 32". In other embodiments, either the magnetic stripe 32(n) or the contactless element 32(o) may be present in the portable consumer device 32". In some implementations, portable consumer device 32" can comprise a purchase card. Payment card 32" can include a consumer identifier associated with the consumer, an account number associated with an account the consumer has with the issuer, or other identifying information. This identifying information can be used by the consumer when creating payment requests, as described above.

Figure 4:
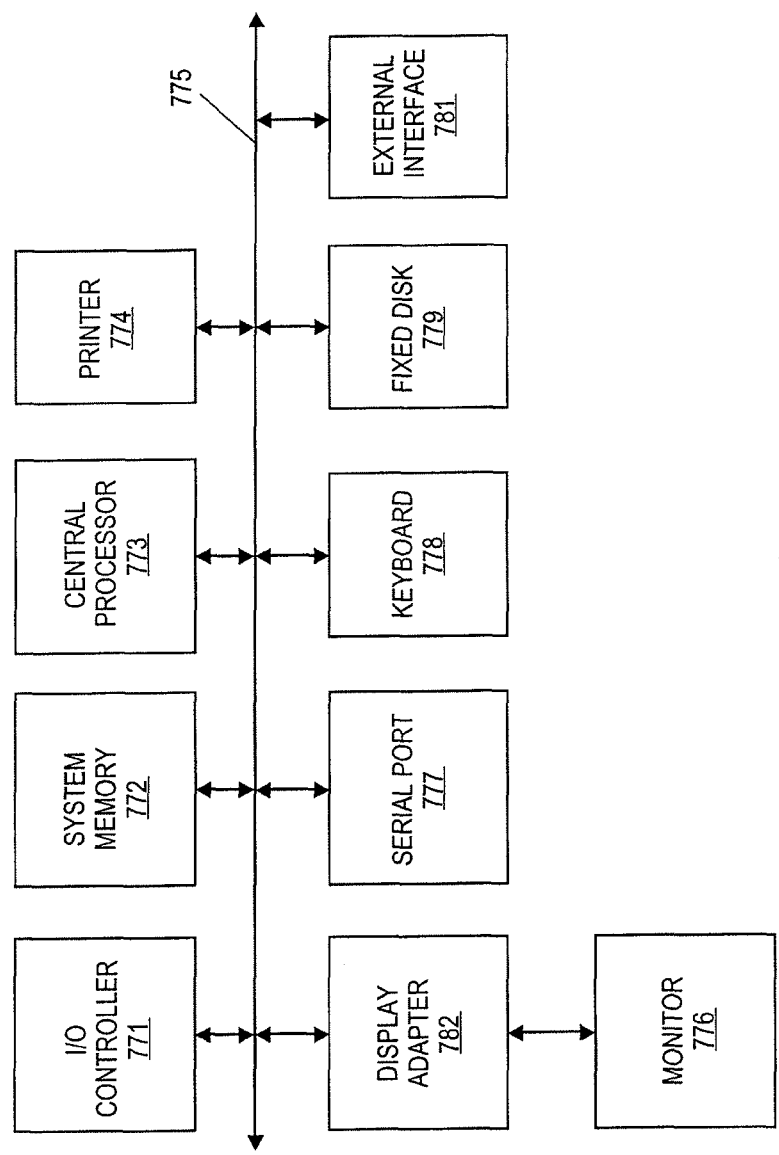
FIG. 4 shows a block diagram of a computer apparatus.
Figure 5A:
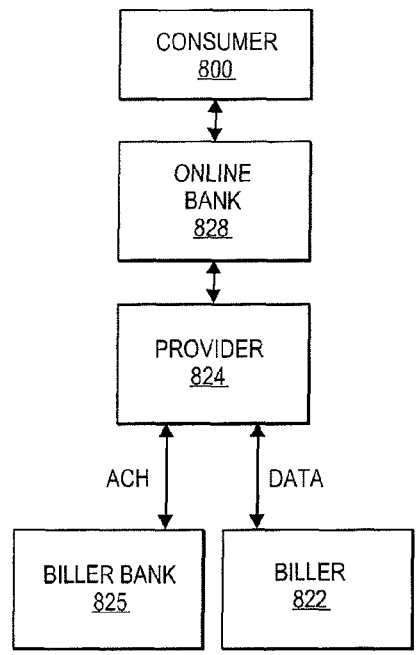
FIGS. 5(a)-5(b) show block diagrams of prior art systems.
Figure 5B:
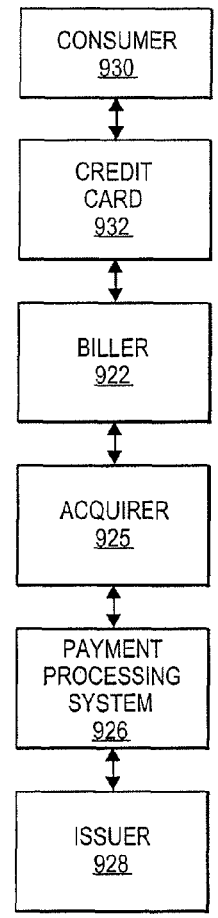

The various participants and elements in FIGS. 1-3(b) may operate or use one or more computer apparatuses to facilitate the functions described herein. Any of the elements in FIG. 1 (e.g., the OLB 28a, the biller 22, the biller bank 24, the non-bank acquirer 24, the payment processing system 26, etc.) or in FIG. 2 may use any suitable number of subsystems to facilitate the steps and functions described herein. Examples of such subsystems or components are shown in FIG. 4. The subsystems shown in FIG. 4 are interconnected via a system bus 775. Additional subsystems such as a printer 774, keyboard 778, fixed disk 779 (or other memory comprising computer readable media), monitor 776, which is coupled to display adapter 782, and others are shown. Peripherals and input/output (I/O) devices, which couple to I/O controller 771 (which can be a processor or other suitable controller), can be connected to the computer system by any number of means known in the art, such as serial port 777. For example, serial port 777 or external interface 781 can be used to connect the computer apparatus to a wide area network such as the Internet, a mouse input device, or a scanner. The interconnection via system bus allows the central processor 773 to communicate with each subsystem and to control the execution of instructions from system memory 772 or the fixed disk 779, as well as the exchange of information between subsystems. The central processor 773 can be a processor such as a microprocessor or other suitable controller. The system memory 772 and/or the fixed disk 779 may embody a computer readable medium.

Embodiments of the invention are not limited to the above-described embodiments. For example, although separate functional blocks are shown for an issuer, online banking website, payment processing system, biller, biller bank, and non-bank acquirer, some entities perform all of these functions and may be included in embodiments of invention.

It should be understood that the present invention as described above can be implemented in the form of control logic using computer software in a modular or integrated manner. Based on the disclosure and teachings provided herein, a person of ordinary skill in the art can know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a tangible computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above descriptions are illustrative and are not restrictive. Many variations of the embodiments described herein will become apparent to those skilled in the art upon review of the disclosure. The scope of the embodiments should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. A recitation of "she" is meant to be gender neutral, and may be read as "he" or "she", unless specifically indicated to the contrary.

All patents, patent applications, publications, and descriptions mentioned above are herein incorporated by reference in their entirety for all purposes. None is admitted to be prior art.

What is claimed is:

1. A method for making a bill payment to a biller, comprising:
   receiving a payment instruction message for making a payment using an account associated with a portable consumer device, the payment instruction message including biller information relating to the biller, wherein the payment instruction message is received from a non-bank acquirer, wherein the payment instruction message is a first payment instruction message and is received in a batch file, the batch file including a plurality of payment instruction messages;
   parsing, using a computer apparatus, the batch file to determine each payment instruction message in the plurality of payment instruction messages;
   sending, using the computer apparatus, each payment instruction message, as a separate authorization request message, to an appropriate issuer;
   receiving a payment approval message from an issuer of the portable consumer device;
   generating, using the computer apparatus, an approved payment file, and
   sending the approved payment file to the non-bank acquirer,
   wherein the non-bank acquirer and the issuer participate in a settlement process with a payment processing system.

2. The method of claim 1 wherein the non-bank acquirer parses the approved payment file to determine a payment amount and accounts receivable data, and wherein the non-bank acquirer provides the accounts receivable data to the biller and provides the payment amount to a biller bank associated with the biller.

3. The method of claim 1 wherein the non-bank acquirer sends a separate batch file at least 10 times a day, each separate batch file including a plurality of payment instruction messages.

4. The method of claim 1 wherein the payment instruction message is received from the issuer, the payment instruction message includes the payment approval message, and the issuer has access to a biller file database to determine the biller.

5. The method of claim 1 wherein the bill payment is for a transaction, and further wherein the issuer provides dispute rights to the consumer to ensure that the biller fulfills the transaction.

6. The method of claim 5, wherein the issuer provides a refund for the bill payment upon the biller not fulfilling the transaction.

7. A computer readable medium comprising code executable by a processor, the code for implementing the method according to claim 1.

8. A server computer comprising the computer readable medium of claim 7.

9. A method, performed by a non-bank acquirer, for processing a bill payment for a biller using an account associated with a portable consumer device, the method comprising:
   receiving a payment request from a consumer, the payment request for the bill payment;
   generating, using a computer apparatus, a first payment instruction message from the payment request;
   batching the first payment instruction message with a plurality of payment instruction messages into a batch file; and
   sending the batch file to a payment processing system, wherein the payment processing system parses the batch file to determine each payment instruction message in the plurality of payment instruction messages and further wherein the payment processing system sends each payment instruction message in the plurality of payment instruction messages to an appropriate issuer, and further sends the first payment instruction message, as an authorization request message, to an issuer of the portable consumer device;
   receiving an approved payment file from the issuer of the portable consumer device, the approved payment file including biller information;
   parsing, using the computer apparatus, the approved payment file to determine a payment amount, accounts receivable data, and the biller information;
   determining, using the computer apparatus, the biller from the biller information;
   providing the accounts receivable data to the biller; and
   providing the payment amount to a biller bank associated with the biller,
   wherein the non-bank acquirer and the issuer participate in a settlement process with the payment processing system.

10. The method of claim 9 further comprising:
    sending a separate batch file to the payment processing system at least 10 times a day, each separate batch file including a plurality of payment instruction messages.

11. The method of claim 9 wherein the bill payment is for a transaction and the issuer provides dispute rights to the consumer to ensure that the biller fulfills the transaction.

12. The computer readable medium of claim 11 wherein the issuer is configured to provide a refund for the bill payment upon the biller not fulfilling the transaction.

13. A computer readable medium comprising code executable by a processor, the code for implementing the method according to claim 9.

14. A server computer comprising the computer readable medium of claim 13.

15. A method for making a bill payment to a biller using an account associated with a portable consumer device, comprising:
   directing a web browser on a computer apparatus to a bill pay website; and
   entering, using the computer apparatus, a payment request into the bill pay website for making the bill payment, the payment request including biller information, wherein an issuer of the portable consumer device approves the bill payment, and further wherein a non-bank acquirer receives an approved payment file for the bill payment, upon the approval of the bill payment,
   wherein the non-bank acquirer generates a first payment instruction message from the payment request, batches the first payment instruction message in a batch file that includes a plurality of payment instructions, and sends the batch file to a payment processing system, further wherein the payment processing system parses the batch file to determine each payment instruction message in the plurality of payment instruction messages and further wherein the payment processing system sends each payment instruction message in the plurality of payment instruction messages to an appropriate issuer, and further sends the first payment instruction message, as an authorization request message, to an issuer of the portable consumer device for approval,
   wherein the non-bank acquirer and the issuer participate in a settlement process with the payment processing system.

16. The method of claim 15, wherein the bill pay website is hosted by the non-bank acquirer.

17. The system of claim 15, wherein the bill payment is for a transaction, and the non-bank acquirer is not responsible for ensuring that the biller fulfills the transaction.

18. A computer readable medium comprising code executable by a processor, the code for implementing the method according to claim 15.

19. A server computer comprising the computer readable medium of claim 18.

20. The method of claim 1 wherein the non-bank acquirer has no liability if the biller does not fulfill the transaction.

21. The method of claim 20 wherein the payment instruction message is in an XML format.

22. The method of claim 1 further comprising:
   sending a separate batch file to the payment processing system at least 2 times a day, each separate batch file including a plurality of payment instruction messages.

23. The method of claim 1 further comprising sending, using the computer apparatus, different payment instruction messages in the batch file to different issuers.

\* \* \* \* \*